(12) United States Patent
Alonso et al.

(10) Patent No.: US 9,299,113 B2
(45) Date of Patent: Mar. 29, 2016

(54) SOCIAL MEDIA DRIVEN INFORMATION INTERFACE

(71) Applicant: Microsoft Corporation, Redmond, WA (US)

(72) Inventors: Omar Alonso, Redwood Shores, CA (US); Vasileios Kandylas, Sunnyvale, CA (US); Kartikay Khandelwal, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/026,864

(22) Filed: Sep. 13, 2013

(65) Prior Publication Data

US 2015/0081713 A1    Mar. 19, 2015

(51) Int. Cl.
*G06F 17/30* (2006.01)
*G06F 7/00* (2006.01)
*G06Q 50/00* (2012.01)
*G06Q 10/10* (2012.01)

(52) U.S. Cl.
CPC .............. *G06Q 50/01* (2013.01); *G06Q 10/109* (2013.01); *G06F 17/30598* (2013.01); *G06F 17/30619* (2013.01); *G06F 17/30705* (2013.01); *G06F 17/30864* (2013.01)

(58) Field of Classification Search
USPC ........................................................ 707/738
See application file for complete search history.

(56) References Cited

U.S. PATENT DOCUMENTS 8,516,374 B2 *  8/2013  Fleischman ............ G06Q 30/02
                                                                     715/716
2003/0033296 A1   2/2003  Rothmuller et al.
2008/0098313 A1   4/2008  Pollack
2008/0288494 A1  11/2008  Brogger et al.
(Continued)

FOREIGN PATENT DOCUMENTS

EP          2568427 A1    3/2013
WO     2011011398 A2    1/2011

OTHER PUBLICATIONS

Kashoob, et al., "A Categorical Model for Discovering Latent Structure in Social Annotations", In Proceedings of International Conference on Weblogs and Social Media, May 17, 2009, 8 pages.
(Continued)

*Primary Examiner* — Kuen Lu
(74) *Attorney, Agent, or Firm* — Dave Ream; Tom Wong; Micky Minhas

(57) ABSTRACT

One or more techniques and/or systems are provided for populating an information interface based upon social media data. For example, users may post, share, and/or discuss various information through social media sources. Accordingly, social media data may be obtained from such social media sources. The social media data may be grouped into sets of social media data based upon temporal information. Within the sets of social media data, social media entries may be clustered into topic clusters (e.g., a royal wedding topic cluster, a plane crash topic cluster, etc.). Event summaries may be generated for respective topic clusters. The event summaries may be used to populate timeslots of an information interface, such as a calendar or timeline, to create annotated timeslots. In this way, the information interface may provide users with an interactive view of events over a time period, such as a year-in-review, based upon social media data.

20 Claims, 11 Drawing Sheets

(56) References Cited

U.S. PATENT DOCUMENTS

| | | |
|---|---|---|
| 2009/0112467 A1 | 4/2009 | Jiang et al. |
| 2011/0040760 A1 | 2/2011 | Fleischman et al. |
| 2011/0202866 A1 | 8/2011 | Huang et al. |
| 2011/0225015 A1 | 9/2011 | Spivack et al. |
| 2012/0185259 A1 | 7/2012 | Roitman et al. |
| 2012/0290950 A1* | 11/2012 | Rapaport ............... H04L 51/32 715/753 |
| 2013/0073972 A1 | 3/2013 | Yung et al. |
| 2013/0185055 A1* | 7/2013 | Theoret ............... G06F 17/277 704/9 |
| 2013/0304818 A1* | 11/2013 | Brumleve ............... H04L 67/02 709/204 |
| 2014/0129558 A1 | 5/2014 | Estes |

OTHER PUBLICATIONS

"International Search Report and Written Opinion Issued in PCT Application No. PCT/US2014/055558", Mailed Date: May 28, 2015, 11 Pages.

* cited by examiner

SOCIAL MEDIA DRIVEN INFORMATION INTERFACE

BACKGROUND

Many users post and share information through various social networking services. In an example, a user may use a mobile device to capture a soccer championship game photo of a player scoring a winning goal. The user may upload the soccer championship game photo to an image sharing service for other users to view, comment on, share, and/or the like. The user may tag the soccer championship game photo with a hashtag, such as #championshipgoal, which may facilitate discovery of the championship game photo by other users performing an image search. In another example, multiple users of a microblog discussion service may engage in a microblog discussion regarding a recent political debate. In this way, users may share information through image sharing services, microblog discussion services, social network profiles, and/or a variety of other social networking services.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for populating an information interface based upon social media data are provided herein. Users may share, discuss, and/or discover information relating to entities (e.g., a soccer player, a new restaurant chain, a city, a new car, etc.) and/or events (e.g., a hurricane, birth of a royal baby, a tennis championship match, etc.) associated with a wide variety of topics through social media services, such as a photo sharing service, a social network, a microblog service, a search engine service, etc. Such social media data may be obtained from one or more social media sources.

In an embodiment, the social media data may be grouped into sets of social media data based upon temporal information. For example, a first set of social media data may be identified from the social media data based upon the first set of social media data corresponding to a first time range (e.g., social network posts, shared images, microblog discussions, and/or other social media entries corresponding to a particular day). In this way, the sets of social media data may correspond to social media entries occurring within particular time ranges, such as days of the year.

Topic clusters may be identified from the sets of social media data (e.g., social media entries within respective sets of social media data may be clustered into topic clusters). In an example, a first topic cluster may be identified from the first set of social media data. The first topic cluster may comprise one or more social media entries having topics that are similar above a topic clustering threshold. For example, the first topic cluster may comprise social media entries pertaining to a soccer game occurring on Sep. 12, 2013, a second topic cluster may comprise social media entries pertaining to a large corporation merger occurring on Sep. 12, 2013, a third topic cluster may comprise social media entries pertaining to a plane crash on Sep. 13, 2013, a fourth topic cluster may comprise social media entries pertaining to peace treaty on Sep. 13, 2013, etc.

In an embodiment, the social media data may be grouped into topic clusters (e.g., without initially being grouped based upon temporal information). For example, a first topic cluster may be identified having one or more social media entries having a first topic similarity above a first topic clustering threshold, a second topic cluster may be identified having one or more social media entries having a second topic similarity above a second topic clustering threshold, etc. After the social media data is grouped or clustered into topic clusters, one or more temporal groupings of social media entries within a topic cluster may be identified. For example, a sports topic cluster (e.g., a first topic cluster) may be identified from the social media data (e.g., not based upon temporal information). The sports topic cluster may comprise a wide variety of sports related social media entries. A first temporal grouping of social media entries corresponding to a first time range may be identified from the sports topic cluster, a second temporal grouping of social media entries corresponding to a second time range may be identified from the sports topic cluster, etc. For example, a first temporal grouping of social media entries derived from the sports topic cluster may comprise one or more social media entries pertaining to the Olympics, where the one or more social media entries within the first temporal grouping span a time range (e.g., several days) during which the Olympics occur. It will be appreciated that grouping social media data into topic clusters and then identifying a temporal grouping of social media entries within a topic cluster may facilitate or simplify finding events that span a relatively long time span. In this way, a user may not have to peruse multiple time spans (e.g., 1 day, 2 days, etc.) to determine if two topic clusters (e.g., in neighboring days) pertain to the same event, topic, etc.

It will be appreciated that the examples provided herein are not meant to be limiting (e.g., temporal groupings are not limited to granularity of a day, days, 24 hrs., etc.). For example, social media entries may be clustered into topic clusters and/or grouped into temporal groupings corresponding to any granularity of time ranges, such as weeks, months, or any arbitrary time period. In an example, a first temporal grouping of social media entries within a Sports topic cluster may correspond to a MLB baseball season and thus may span a time range of about 8 months, whereas a second grouping of social media entries within the Sports topic cluster may correspond to MLB baseball playoffs and thus may span a time range of about 2 months.

Respective event summaries may be generated for different topic clusters and/or for different temporal groupings of social media entries within a topic cluster. For example, the soccer game social media entries within the first topic cluster may be evaluated to generate a soccer event summary describing the soccer game on Sep. 12, 2013 (e.g., the soccer event summary may comprise an image, a short description of the soccer game, a social network message, a hashtag, a description of the teams that played the soccer game, and/or a variety of other information that may correspond to soccer game social media entries having a ranking above a popularity threshold, such as a relatively high number of shares, likes, views, etc.). In an example, one or more event summaries may be annotated with a category, such as sports, entertainment, etc. Thus, a user may filter event summaries for events corresponding to a particular category (e.g., of interest to the user). In this way, event summaries may be created for time ranges based upon topic clusters (e.g., the soccer event summary and a corporation merger event summary may be associated with a Sep. 12, 2013 time range, a plane crash event summary and a peace treaty event summary may be associated with the Sep. 13, 2013 time range, etc.). In this way, timeslots (e.g., timeslots representing days, weeks, months, etc.) of an information interface, such as a calendar or timeline, may be populated with event summaries. The information interface may provide a historical, a current, and/or a future summary of events identified from social media data (e.g., a year-in-review, a future event predicted based upon a recurring event such as the Olympics; etc.). It may be appreciated that the information interface may be provided through various types of interfaces, such as a calendar app, a search results page, as a social network interface, a timeline, a carousel, and/or any other (e.g., interactive) interface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
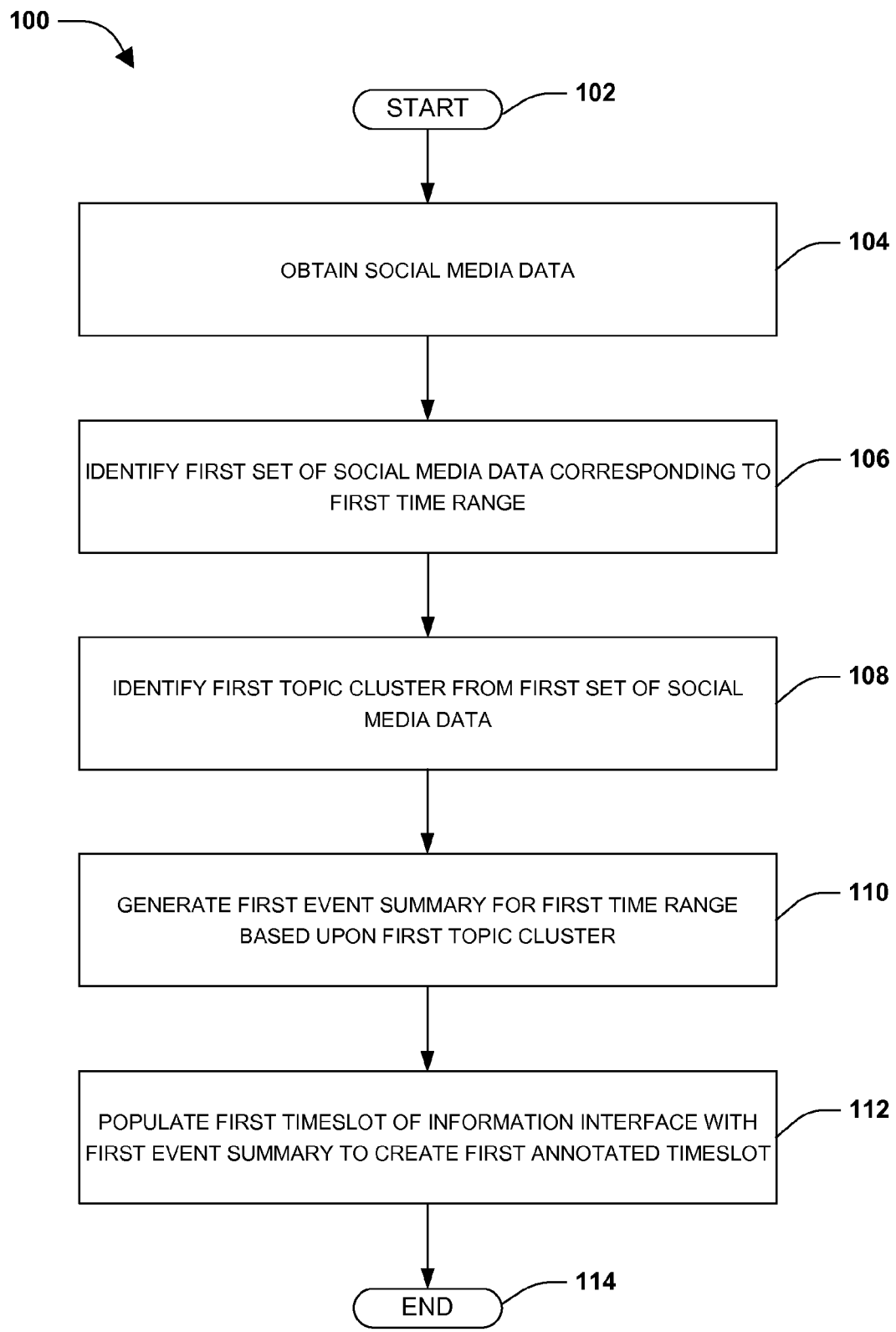
FIG. 1 is a flow diagram illustrating an exemplary method of populating an information interface based upon social media data.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of populating an information interface based upon social media data is illustrated by an exemplary method 100 of FIG. 1. At 102, the method starts. At 104, social media data may be obtained from one or more social media sources. In an example, social network posts may be extracted from a social network, microblog messages may be extracted from a microblog discussion network, search queries may be extracted from a search engine network, hashtags may be extracted from a first social media source, images may be extracted from an image sharing network, a link may be extracted from a second social media source, multimedia content may be extracted from a third social media source, etc. In another example, a social media source may provide a ranked list of social media data maintained by the social media source (e.g., hashtags, images, posts, or other social media entries having relatively high popularity rankings based upon an amount of shares, likes, views, occurrences, etc.). In this way, the social media data may be extracted from various social media sources. Because the social media data may comprise redundant data (e.g., hundreds of instances of a soccer game winning shot photo), deduplication may be performed on the social media data.

The social media data may be grouped into sets of social media data based upon time ranges (e.g., days, weeks, months, etc.). Accordingly, a first set of social media is identified from the social media data, at 106. The first set of social media data may correspond to a first time range (e.g., social media entries corresponding to a particular day). In this way, the social media data may be grouped based upon temporal criteria, such as days of the year.

Respective sets of social media data may be clustered by topics into topic clusters (e.g., the first set of social media data may have social media entries corresponding to a soccer game topic, a business merger topic, and a new amusement park topic for the first time range; a second set of social media data may have social media entries corresponding to a plane crash topic, a baseball game topic, and a new movie release topic for a second time range). Accordingly, a first topic cluster is identified from the first set of social media data, at 108. The first topic cluster comprises a first social media entry and/or other social media entries having topic similarities above a first topic clustering threshold (e.g., social media entries corresponding to a soccer game may be clustered into a soccer game topic cluster). In an example, a second topic cluster is identified from the second set of social media data. The second topic cluster comprises a second social media entry and/or other social media entries having topic similarities above a second topic clustering threshold (e.g., social media entries corresponding to a plane crash may be clustered into a plane crash topic cluster). In this way, social media entries within respective sets of social media data may be clustered into topic clusters.

In an example, one or more entities may be identified from social media entries within a topic cluster. For example, a first entity (e.g., a soccer player A who plays for Team A) may be identified from a first social media entry. A second entity (e.g., soccer player B who plays for Team B) may be identified from a second social media entry. A relationship between the first entity and the second entity may be determined (e.g., Team A played Team B in the soccer game where player A scored a winning shot past player B). In this way, the first social media entry and the second social media entry may be included within the first topic cluster based upon the relationship. The relationship may be used for deduplication, clustering, event summary generation, etc.

Event summaries may be generated for respective topic clusters. Accordingly, a first event summary may be generated for the first time range based upon the first topic cluster, at 110. The first event summary may comprise various descriptive information associated with events and/or entities of the first topic cluster. For example, an event description (e.g., a caption derived from text of social media entries within the soccer game topic cluster having relatively high rankings corresponding to quality, relevancy, popularity, etc.) of the soccer game, an image of a game winning shot (e.g., an image having a threshold number of shares, likes, views, etc.), an entity description of a soccer player (e.g., identified from text of social media entries within the soccer game topic cluster), a category (e.g., a sports category assigned to the first topic cluster), a hashtag (e.g., a hashtag #championshipwinners used to tag a threshold number of social media entries), a link to web content (e.g., a team roster), a link to a social network page (e.g., a team A social network profile), and/or a variety of other information may be used to generate and/or be comprised within the first event summary. A second event summary may be generated for the first time range based upon the second topic cluster (e.g., information relating to or identifying the plane crash).

Timeslots (e.g., representing days, weeks, months, etc.) of an information interface, such as a calendar, a carousel, a timeline, or other interface, may be populated with event summaries to create annotated timeslots for the information interface. Accordingly, a first timeslot, associated with the first time range, may be populated with the first event summary to create a first annotated timeslot, at 112. In an example, the first annotated timeslot may be annotated with the first event summary and/or the second event summary. In this way, the first timeslot may be annotated with event summaries corresponding to the first time range (e.g., event summaries for a particular day represented by the first annotated timeslot). In an example, an event summary, used to populate a timeslot, may correspond to a recurring event, such as the Olympics. Accordingly, a future timeslot of the information interface may be populated with a future occurrence of the recurring event.

In an example, a plurality of timeslots of the information interface may be populated with event summaries to create a plurality of annotated timeslots. For example, a second set of social media data may be identified from the social media data. The second set of social media data may correspond to a second time range (e.g., the first time range may correspond to Sep. 12, 2013 and the second time range may correspond to Sep. 13, 2013). A second topic cluster may be identified from the second set of social media data. The second topic cluster may comprise a second social media entry and/or other social media entries having topic similarity above a second topic clustering threshold. A second event summary may be generated for the second time range based upon the second topic cluster. A second timeslot, associated with the second time range, of the information interface may be populated with the second event summary to create a second annotated timeslot.

The information interface may be provided according to a variety of interface types. In an example, the information interface may be provided as a calendar (e.g., a day of the calendar may correspond to an annotated timeslot such that the day may be annotated with one or more event summaries or condensed event summaries that are populated within the annotated timeslot). For example, a calendar may be augmented using the information interface to create an augmented calendar. The calendar may be provided as a carousel interface, a calendar application, embedded within a search results page, provided through an operating system search interface such as a search charm, and/or any other type of user interface. In an example, the information interface may be filtered based upon various filter criteria, or rather various filter criteria may be applied to the information interface such that the information interface is merely populated with corresponding, relevant, etc. information. For example, a user may filter the information interface based upon interests of the user (e.g., a particular genre of video games), entity types (e.g., people, places, organizations, etc.), and/or categories (e.g., politics, sports, world, movies, etc.), etc. The filter criteria may be specified by the user or may be provided to the user for selection, for example.

In another example, the information interface may be provided as a timeline (e.g., a day of the timeline may correspond to an annotated timeslot such that the day may be annotated with one or more event summaries or condensed event summaries that are populated within the annotated timeslot). The timeline may comprise an interactive timeline that may facilitate user navigation amongst one or more annotated timeslots (e.g., a zoom-in navigation to display annotated timeslots at a higher granularity over a shorter timespan; a zoom-out navigation to display annotated timeslots at a lower granularity over a larger timespan; a scroll navigation to view annotated timeslots corresponding to a new timespan; etc.). In another example, the information interface may be provided as a carousel interface comprising a plurality of carousel panes where a carousel pane corresponds to an annotated timeslot (e.g., one or more event summaries or condensed event summaries of an annotated timeslot may be used to annotate a corresponding carousel pane). In another example, the information interface may be provided as a year-in-review interface comprising annotated timeslots corresponding to days of a year.

In an example, the information interface may be populated based upon a profile of a user. For example, the profile of the user (e.g., a profile based upon a social network profile, email messages sent/received by the user, topics discussed by the user such as through a microblog session, etc.) may be evaluated to identify a first interest of the user. One or more event summaries may be selectively displayed through the information interface based upon the one or more event summaries corresponding to the first interest. For example, the user may have an interest in soccer but may have expressed a disinterest in politics. Accordingly, soccer event summaries, but not political event summaries, may be populated within the information interface. In an example, the information interface may be populated with a plurality of event summaries. A first set of event summaries, but not a second set of event summaries, may be selectively displayed based upon a filter criteria (e.g., the user may select a videogame filter criteria such that merely videogame event summaries are displayed). In an example, the information interface may be provided as an interactive interface. A first set of annotated timeslots may be displayed through the interactive interface based upon a first view granularity. The first set of annotated timeslots may correspond to a first event summary granularity (e.g., event summaries populated at a monthly granularity). Responsive to a zoom input associated with the interactive interface, display of the first set of annotated timeslots may be transitioned to a second set of annotated timeslots based upon a second view granularity specified by the zoom input. The second set of annotated timeslots may correspond to a second event summary granularity (e.g., event summaries populated at a weekly granularity) different than the first event summary granularity. In this way, event summaries may be derived from social media data, and may be used to populate an information interface such as a calendar, carousel, timeline, and/or other (e.g., interactive) interface. At 114, the method ends.

Figure 2:
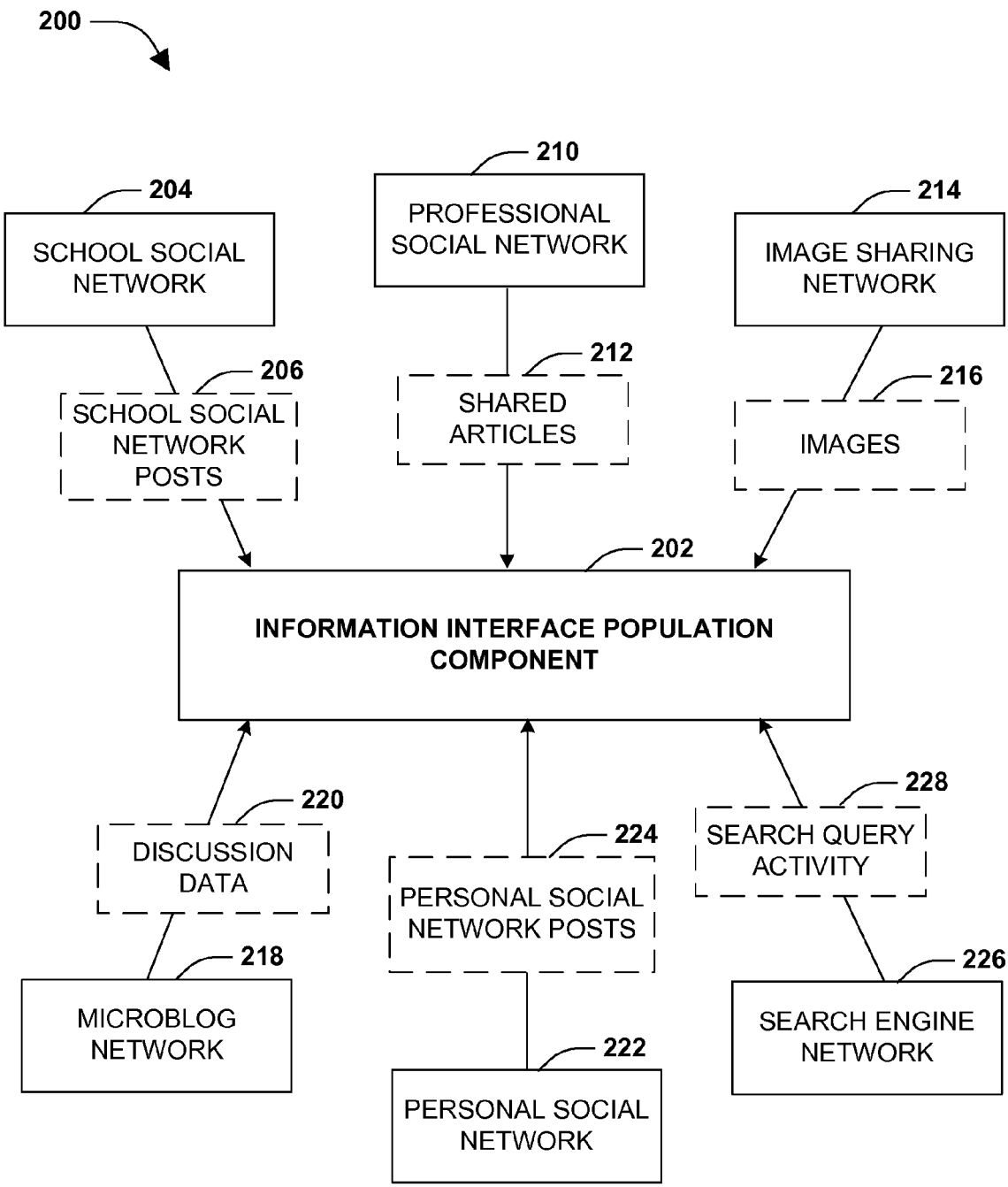
FIG. 2 is a component block diagram illustrating an exemplary system for obtaining social media data.

FIG. 2 illustrates an example of a system 200 for obtaining social media data. The system 200 comprises an information interface population component 202. The information interface population component 202 is configured to obtain social media data from one or more social media sources, which may be used to populate an information interface with event summaries derived from the social media data, for example. The information interface population component 202 may obtain school social network posts 206 from a school social network 204, shared articles 212 from a professional social network 210, images 216 from an image sharing network 214, discussion data 220 from a microblog network 218, personal social network posts 224 from a personal social network 222, search query activity 228 from a search engine network 226, and/or other social media data from other social media sources.

Figure 3:
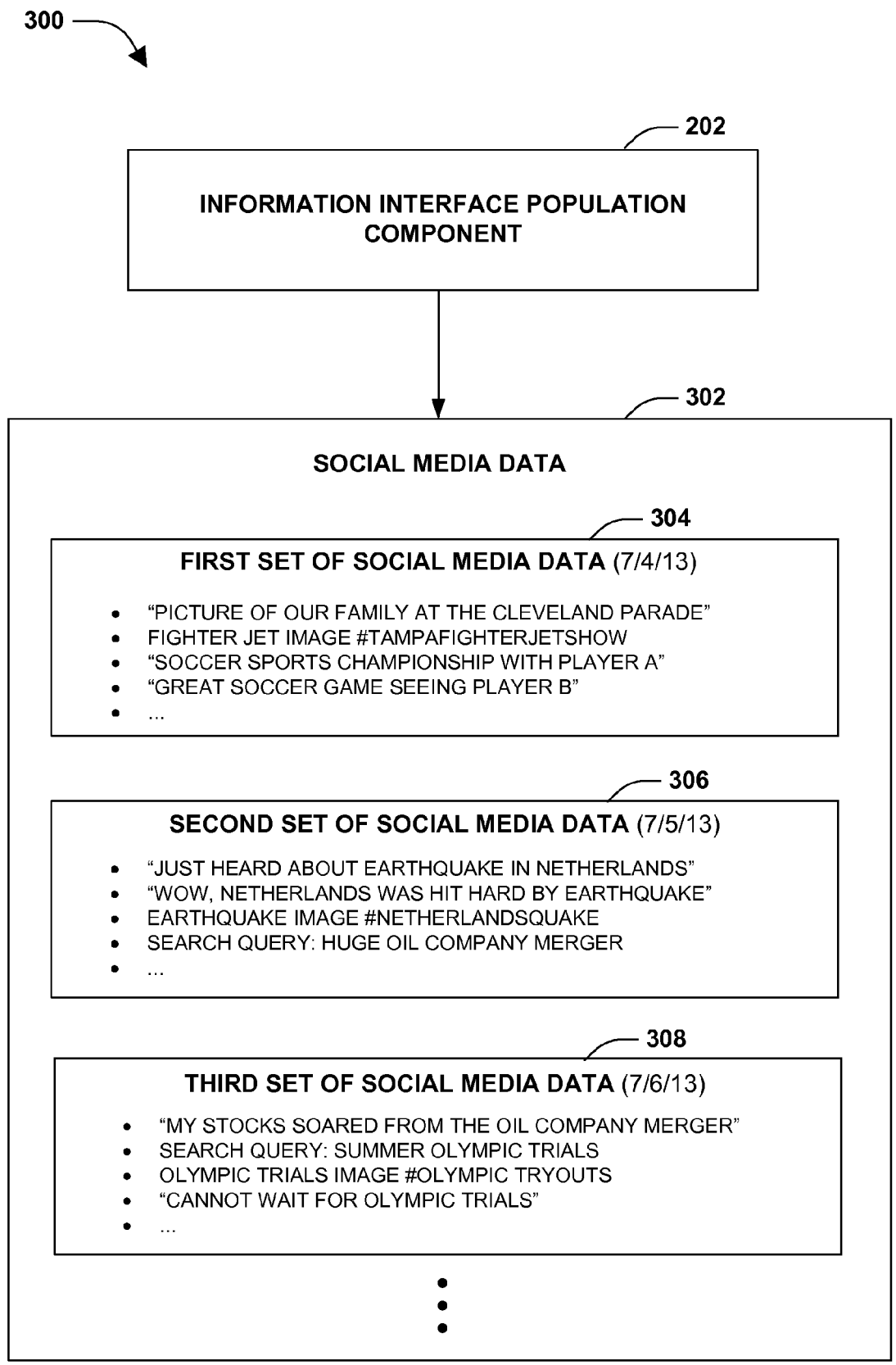
FIG. 3 is a component block diagram illustrating an exemplary system for identifying sets of social media data.

FIG. 3 illustrates an example of a system 300 for identifying sets of social media data. The system 300 comprises an information interface population component 202. In an example, the information interface population component 202 may have obtained social media data from various social media sources (e.g., FIG. 2). The information interface population component 202 may be configured to identify a first set of social media data 304, a second set of social media data 306, a third set of social media data 308, and/or other sets of social media data from the social media data based upon temporal criteria. In an example, the sets of social media data are identified based upon time ranges, such as days of the year. For example, the first set of social media data 304 comprises one or more social media entries corresponding to Jul. 4, 2013 (e.g., social media entries pertaining to a Cleveland parade, a Tampa fighter jet show, a soccer game, and/or other events occurring on Jul. 4, 2013), the second set of social media data 306 comprises one or more social media entries corresponding to Jul. 5, 2013 (e.g., social media entries pertaining to a Netherlands earthquake, a company merger, and/or other events occurring on Jul. 5, 2013), and the third set of social media data 308 comprises one or more social media entries corresponding to Jul. 6, 2013 (e.g., social media entries pertaining to an increase in the stock market, Olympic trials, and/or other events occurring on Jul. 6, 2013).

Figure 4:
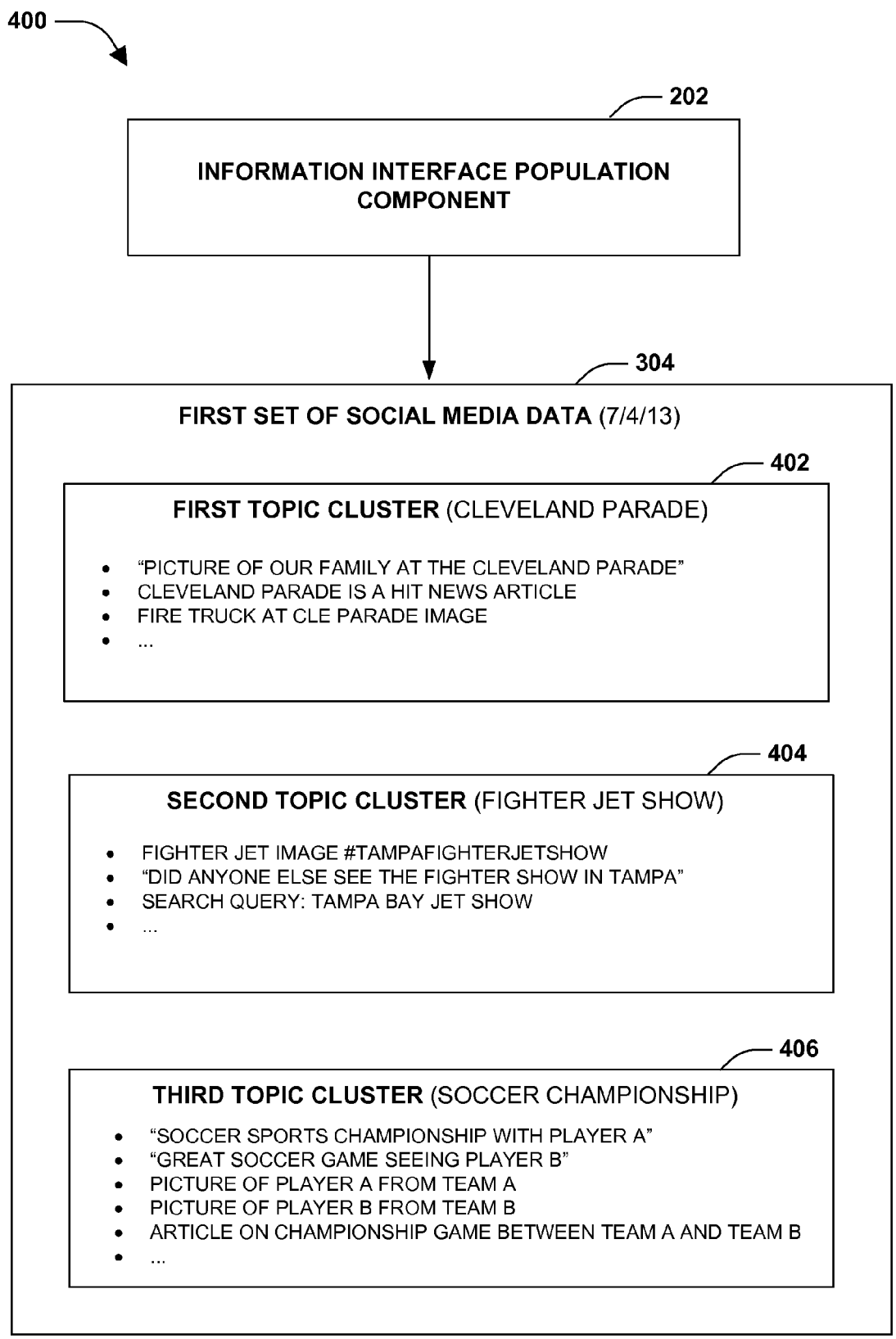
FIG. 4 is a component block diagram illustrating an exemplary system for identifying topic clusters for sets of social media data.

FIG. 4 illustrates an example of a system 400 for identifying topic clusters for sets of social media data. The system 400 comprises an information interface population component 202. In an example, the information interface population component 202 may have identified sets of social media data, such as a first set of social media data 304 corresponding to social media entries occurring on Jul. 4, 2013 (e.g., FIG. 3). The information interface population component 202 may be configured to cluster social media entries within the first set of social media data 304 based upon topics similarity. In an example, the information interface population component 202 may identify a first topic cluster 402 based upon one or more social media entries having similar features (e.g., textual features, imagery features, etc.). For example, a "picture of our family at the Cleveland parade" social network post, a Cleveland parade is a hit news article shared through a social network, a fire truck at CLE parade image shared through an image sharing network, and/or other social media entries corresponding to a Cleveland parade topic above a first topic similarity may be identified as the first topic cluster 402. In another example, a fighter jet image shared through a social network using a hashtag #tampafighterjetshow, a "did anyone else see the fighter show in Tampa" social network post, a search query Tampa Bay jet show, and/or other social media entries corresponding to a fighter jet show topic above a second topic similarity threshold may be identified as a second topic cluster 404. In another example, a "soccer sports championship with player A" microblog discussion message, a "great soccer game seeing player B" social network post, a picture of player A from Team A shared through a social network, a picture of player B from Team B shared through an image sharing network, an article on championship game between Team A and Team B posted by a sports network, and/or other social media entries corresponding to a soccer championship topic above a third topic similarity may be identified as a third topic cluster 406.

Because a topic cluster may comprise redundant social media entries (e.g., the first topic cluster may comprise 2,000 instances of the fire truck at CLE parade image), the information interface population component 202 may be configured to remove duplicate social media entries utilizing deduplication functionality. In an example, the information interface population component 202 may be configured to rank social media entries based upon various ranking criteria, such as a number of shares, a number of likes, a number of views, quality, relevancy, user interest, user interaction, and/or other ranking criteria.

The information interface population component 202 may be configured to generate event summaries for respective topics clusters. For example, a first event summary may be created for the first topic cluster 402. The first event summary may comprise information related to a Cleveland parade event (e.g., hashtags used to discuss the Cleveland parade event, an image of the Cleveland parade event, and/or a variety of other information about the Cleveland parade event). A second event summary may be created for the second topic cluster 404. The second event summary may comprise information related to a Tampa Bay fighter jet show event (e.g., hashtags used to discuss the Tampa Bay fighter jet show event, information about a fighter pilot entity, a description of the Tampa Bay fighter jet show event, an image from the Tampa Bay fighter jet show event, a link to a fighter jet social network profile, etc.). In this way, event summaries may be created for topic clusters. The event summaries may be used to populate timeslots of an information interface to create annotated timeslots (e.g., FIGS. 6A-8).

Figure 5:
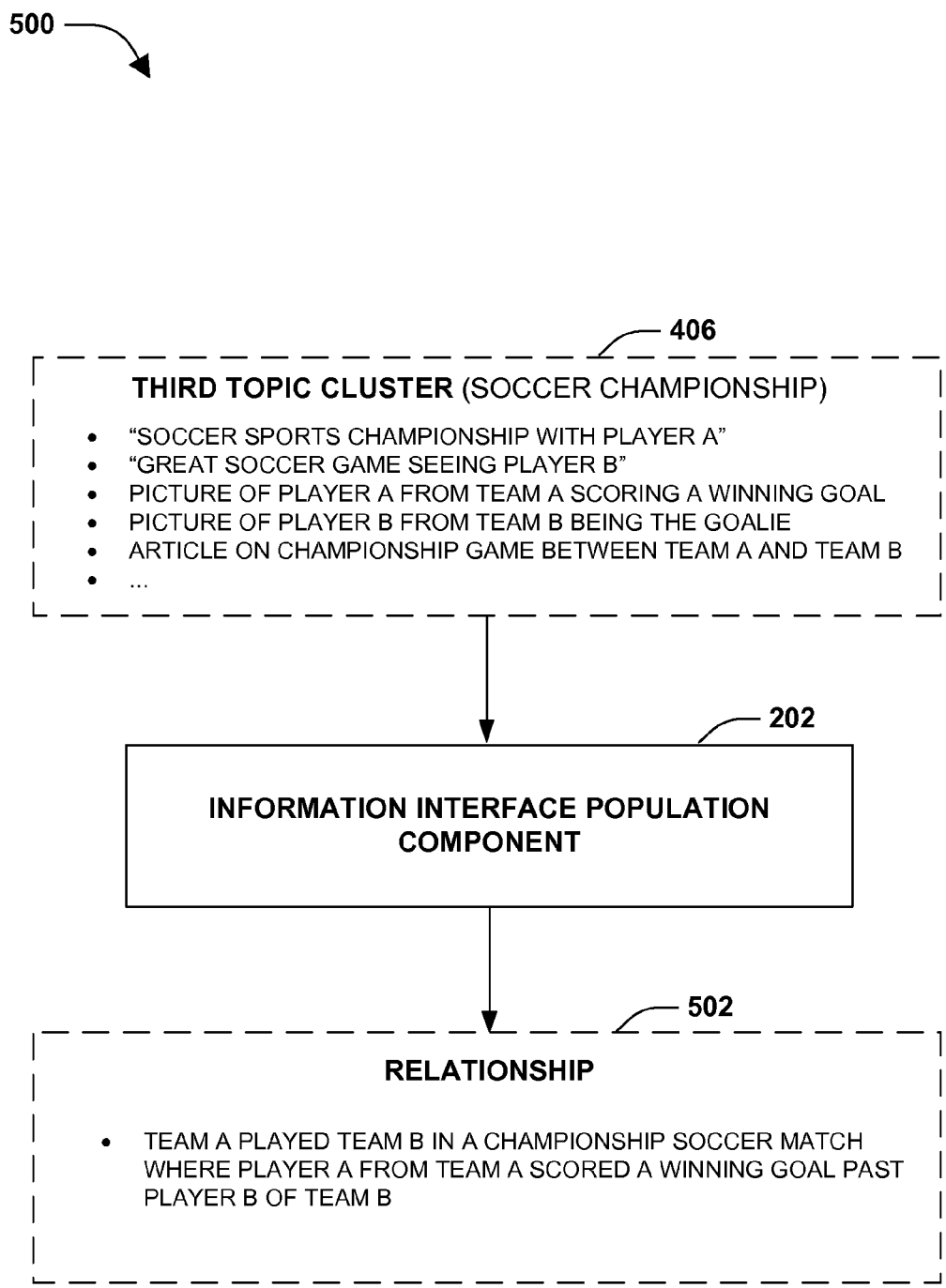
FIG. 5 is a component block diagram illustrating an exemplary system for identifying a relationship between entities associated with social media entries.

FIG. 5 illustrates an example of a system 500 for identifying a relationship between entities associated with social media entries. The system 500 comprises an information interface population component 202. In an example, the information interface population component 202 may have identified a third topic cluster 406 based upon one or more social media entries having topic similarities above a third topic clustering threshold (e.g., FIG. 4). The information interface population component 202 may be configured to identify a first entity associated with a first social media entry. For example, the information interface population component 202 may identify a player A who plays for Team A based upon one or more social media entries within the third topic cluster 406, such as a "soccer sports championship with player A" microblog discussion message, a picture of player A from Team A scoring a winning goal shared through a social network, and/or an article on championship game between Team A and Team B posted by a sports network. The information interface population component 202 may be configured to identify a second entity associated with a second social media entry. For example, the information interface population component 202 may identify a player B of Team B from one or more social media entries within the third topic cluster 406, such as a "great soccer game seeing player B" social network post, a picture of player B from Team B being a goalie shared through an image sharing network, and/or the article on championship game between Team A and Team B.

The information interface population component 202 may determine that a relationship 502 exists between the player A of Team A and the player B of Team B. For example, the relationship 502 may specify that Team A played Team B in a championship soccer match where player A from Team A scored a winning goal past player B of Team B. The relationship 502 may be used for clustering (e.g., a determination as to whether one or more social media entries are to be or remain clustered within the third topic cluster 406), event summary generation (e.g., a soccer championship event summary may be derived from information within the relationship 502), categorization of topic clusters (e.g., the assignment of a sports category and/or the soccer championship topic to the third topic cluster 406), etc.

Figure 6A:
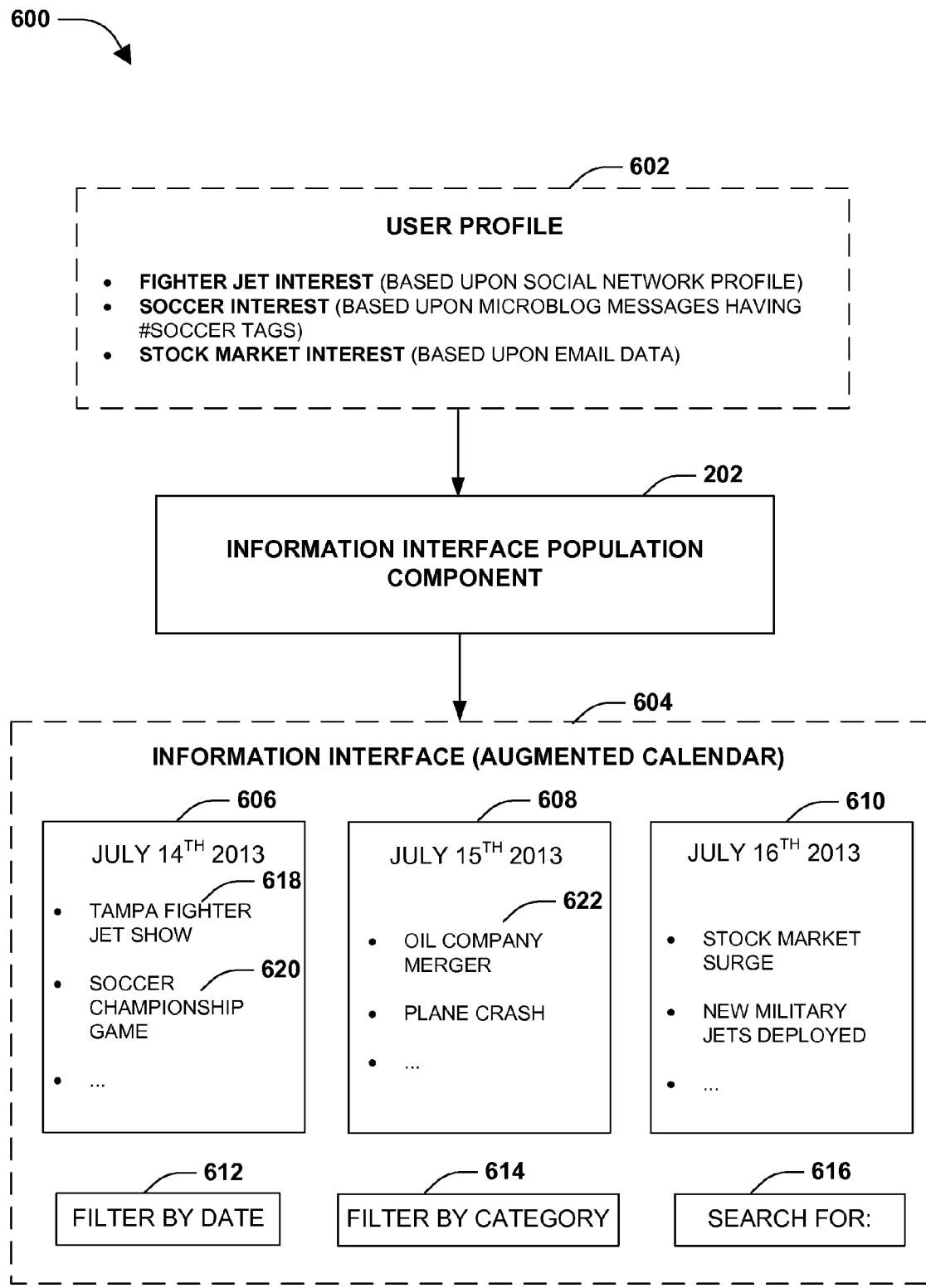
FIG. 6A is a component block diagram illustrating an exemplary system for providing an information interface comprising annotated timeslots.

FIG. 6A illustrates an example of a system 600 for providing an information interface 604 comprising annotated timeslots. The system 600 comprises an information interface population component 202. In an example, the information interface population component 202 may have identified one or more topic clusters of social media entries (e.g., FIG. 4). The information interface population component 202 may have generated one or more event summaries for time ranges based upon topic clusters. For example, a second topic cluster 404 of a first set of social media data 304 may be used to generate a Tampa Bay fighter jet show event summary (e.g., corresponding to a condensed first event summary 618) for a first time range of Jul. 4, 2013 (e.g., corresponding to a first annotated timeslot 606 of the information interface 604). The Tampa Bay fighter jet show event summary may comprise information related to a Tampa fighter jet show derived from social media data. A third topic cluster 406 of the first set of social media data 304 may be used to generate a soccer championship event summary (e.g., corresponding to a condensed second event summary 620) for the first time range of Jul. 4, 2013 (e.g., corresponding to the first annotated timeslot 606 of the information interface 604). The soccer championship event summary may comprise information related to a soccer championship game derived from social media data. An oil company merger topic cluster of a second set of social media data 306 may be used to generate an oil company merger event summary (e.g., corresponding to a condensed third event summary 622) for a second time range of Jul. 15, 2013 (e.g., corresponding to a second annotated timeslot 608 of the information interface 604). The oil company merger event summary may comprise information related to an oil company merger derived from social media data. In this way, event summaries may be generated and used to populate timeslots of the information interface 604 as annotated timeslots.

In an example, the information interface 604 comprises an augmented calendar comprising annotated timeslots, such as the first annotated timeslot 606 populated with the condensed first event summary 618 and the condensed second event summary 620, the second annotated timeslot 608 populated with the condensed third event summary 622 and a condensed fourth event summary for a plane crash event, and/or a third annotated timeslot 610 (e.g., corresponding to a third time range of Jul. 16, 2013) populated with a condensed fifth event summary for a stock market surge event and a condensed sixth event summary for a new military jets deployed event. A user may navigate between various time ranges of the information interface 604. For example, responsive to a view older input, annotated timeslots corresponding to time ranges before July $14^{th}$ may be displayed. Responsive to a view newer input, annotated timeslots corresponding to time ranges after July $16^{th}$ may be displayed. Responsive to receiving a search query through a search interface 616, one or more annotated timeslots populated with event summaries corresponding to the search query may be displayed.

In an example, the information interface population component 202 may be configured to evaluate a user profile 602 of a user to identify one or more interests of the user, such as a fighter jet interest (e.g., based upon a social network profile of the user), a soccer interest (e.g., based upon microblog messages of the user having #soccer tags), and a stock market interest (e.g., based upon emails of the user regarding the stock market). The information interface population component 202 may be configured to selectively display one or more event summaries through the information interface 604 based upon the one or more event summaries corresponding to the one or more interests of the user. For example, the information interface population component 202 may display the condensed first event summary 618, corresponding to the fighter jet interest, and the condensed second event summary 620, corresponding to the soccer interest, but not a condensed event summary corresponding to a Netherlands earthquake that may be populated within the first annotated timeslot 606. In an example, the information interface 604 may be filtered by date 612 (e.g., the user may specify a date range of Apr. 4, 2012 to Jun. 4, 2012 such that the information interface 604 is populated with annotated timeslots between Apr. 4, 2012 and Jun. 4, 2012), filtered by category 614 (e.g., the user may specify a sports category such that the information interface is selectively populated with event summaries corresponding to sports), etc.

Figure 6B:
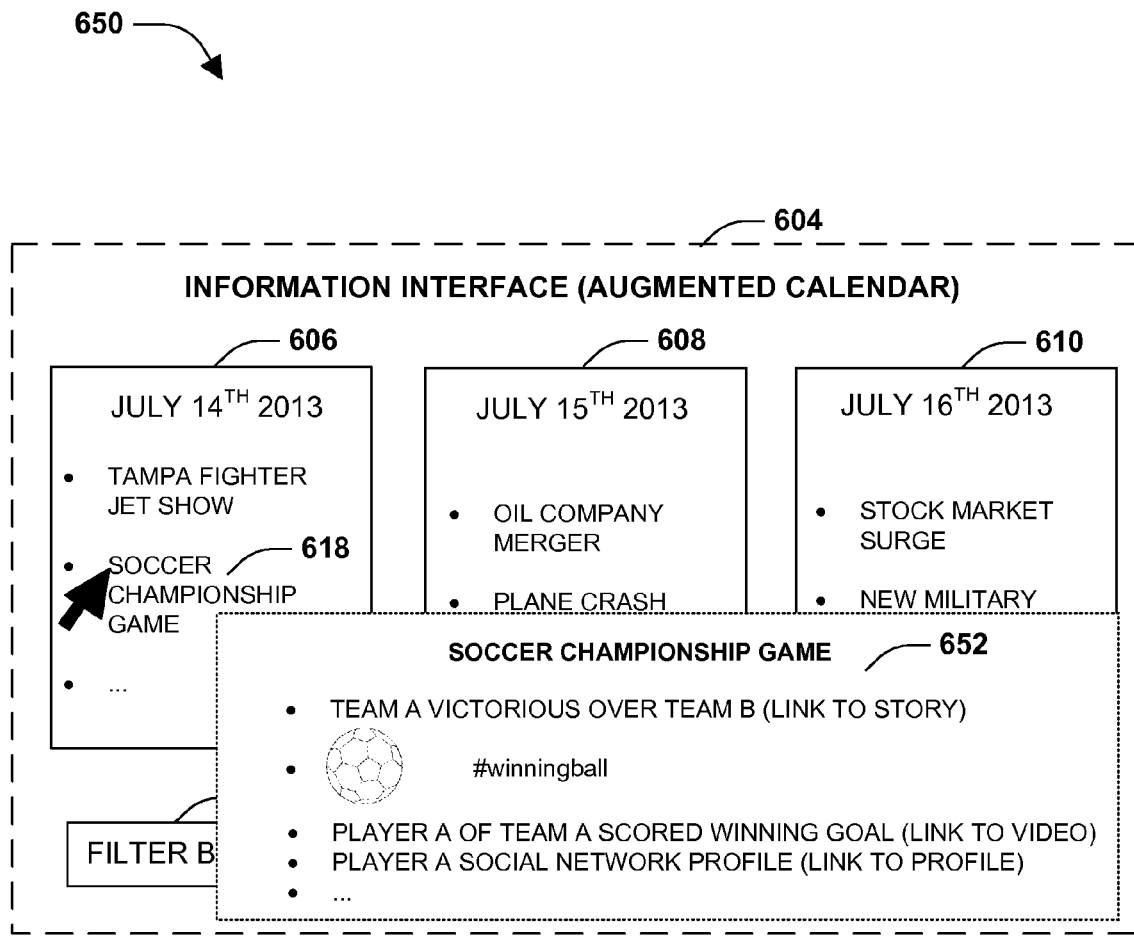
FIG. 6B is an illustration of an example of expanding a condensed event summary of an information interface.

FIG. 6B illustrates an example 650 of expanding a condensed event summary of an information interface 604. In an example, the information interface 604 corresponds to the information interface 604 of FIG. 6A. The information interface 604 comprises one or more annotated timeslots, such as a first annotated timeslot 606 populated with a second condensed event summary 618 and/or other condensed event summaries, a second annotated timeslot 608 populated with one or more condensed event summaries, and/or a third annotated timeslot 610 populated with one or more condensed event summaries.

In an example, the second condensed event summary 618 is selected. Responsive to the selection, a soccer championship game event summary 652 is displayed. The soccer championship game event summary 652 comprises various information about a soccer championship game event. For example, the soccer championship game event summary 652 specifies a link to a Team A victory article, a soccer ball image captured during the soccer championship game event and tagged with a hashtag #winningball, a link to a player A winning goal video, a link to a player A social network profile, etc.

Figure 7:
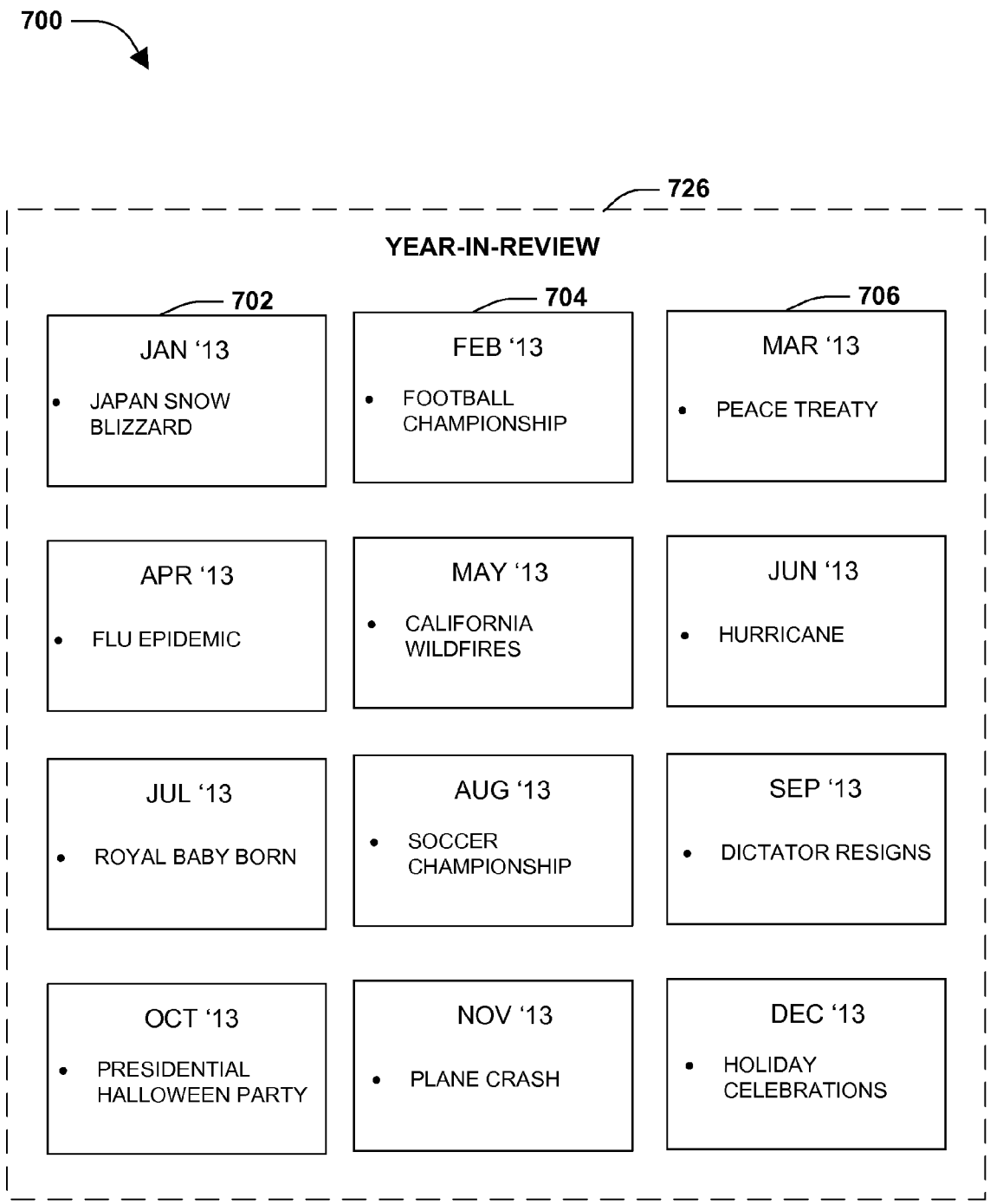
FIG. 7 is an illustration of an example of providing an information interface as a year-in-review interface.

FIG. 7 illustrates an example 700 of providing an information interface as a year-in-review interface 726. The year-in-review interface 726 may comprise timeslots corresponding to months of the year 2013. The timeslots may be populated with event summaries, derived from social media data, to create annotated timeslots. For example, a first annotated timeslot 702 for January 2013 is populated with a Japan snow blizzard event summary and/or summaries of other events that occurred in January, a second annotated timeslot 704 for February 2013 is populated with a football championship event summary and/or summaries of other events that occurred in February, a third annotated timeslot 706 for March 2013 is populated with a peace treaty event summary and/or summaries of other events that occurred March, and/or other annotated timeslots are populated with event summaries derived from social media data. It may be appreciated that the year-in-review interface 726 may display event summaries at various granularity (e.g., a week granularity, a day granularity, etc.). In this way, a user may be provided with a snapshot of main events that may have been popular (e.g., shared by a large number of social network users above a sharing threshold), significant (e.g., viewed by a large number of social network users above a viewing threshold), trending (e.g., discussed by a large number of social network users in a relatively short period of time above a trending threshold), etc. The information interface may be tailored to interests of the user, such that the user is presented with event summaries that are of interest to the user (e.g., sports related) but is not presented with event summaries that are not of interest to the user (e.g., political).

Figure 8:
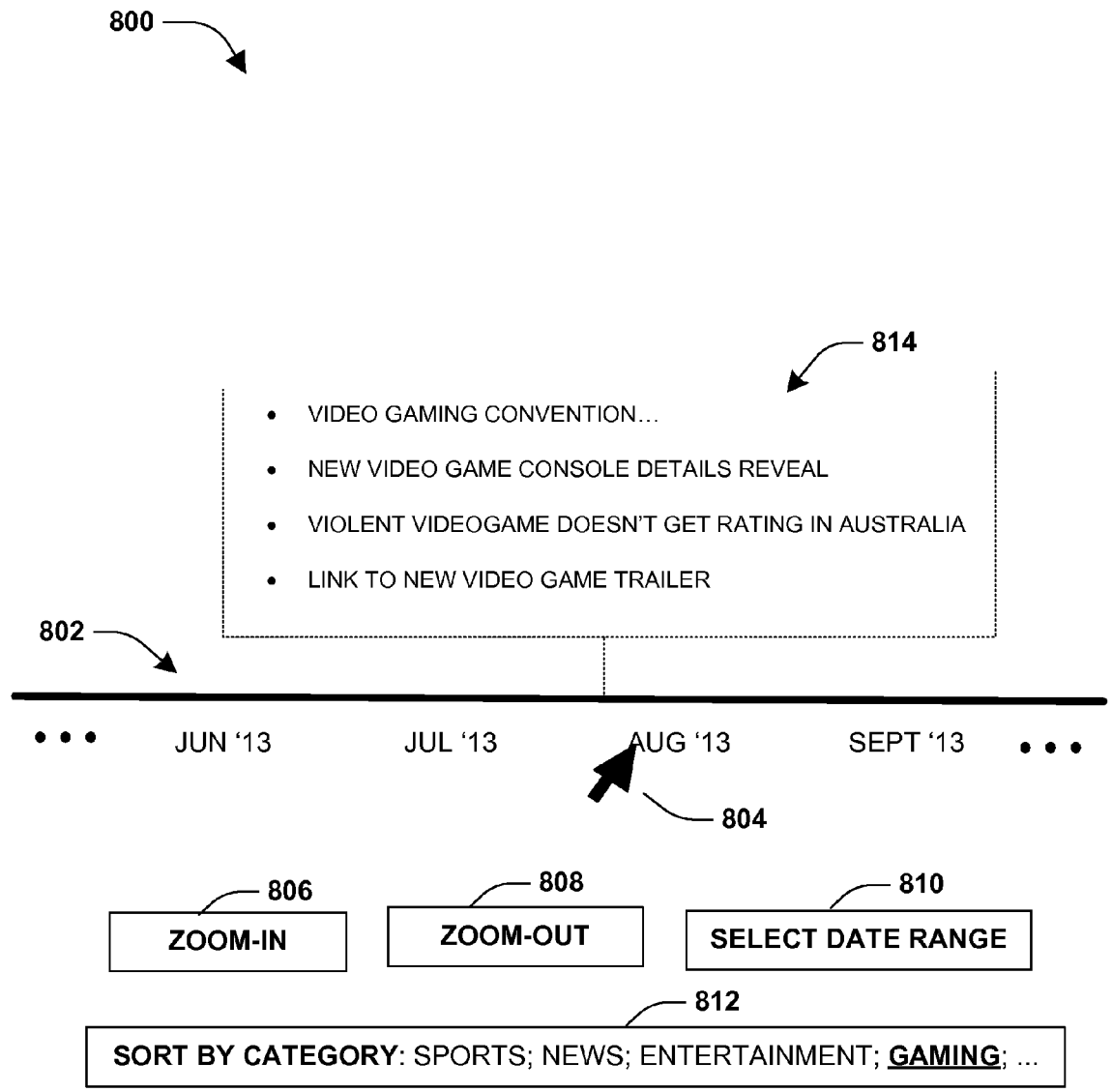
FIG. 8 is an illustration of an example of providing an information interface as a timeline.

FIG. 8 illustrates an example 800 of providing an information interface as a timeline 802. The timeline 802 may comprise a plurality of annotated timeslots. In an example, the timeline 802 may display annotated timeslots at a monthly granularity between June 2013 and September 2013. A zoom-in interface element 806 and/or a zoom-out interface element 808 may be used to zoom into particular view granularities (e.g., a daily granularity, a year-in-review granularity, etc.). A select date range interface element 810 may be used to display annotated timeslots within a particular date range, such as June 2013 to September 2013. A sort interface element 812 may be used to filter event summaries, populated within the annotated timeslots, by category such as a gaming category. In an example, an August 2013 annotated timeslot 804 may be selected. Responsive to the selection, a set of event summaries 814, populated within the August 2013 annotated timeslot 804, may be displayed. The set of event summaries 814 may correspond to the gaming category selected through the sort interface element 812. For example, a video gaming convention event summary, a new video game console details reveal event summary, a violent videogame doesn't get rating in Australia event summary, and a link to new video game trailer event summary may be displayed. In this way, a user may view various event summaries, derived from social media data, through the timeline 802.

Figure 9:
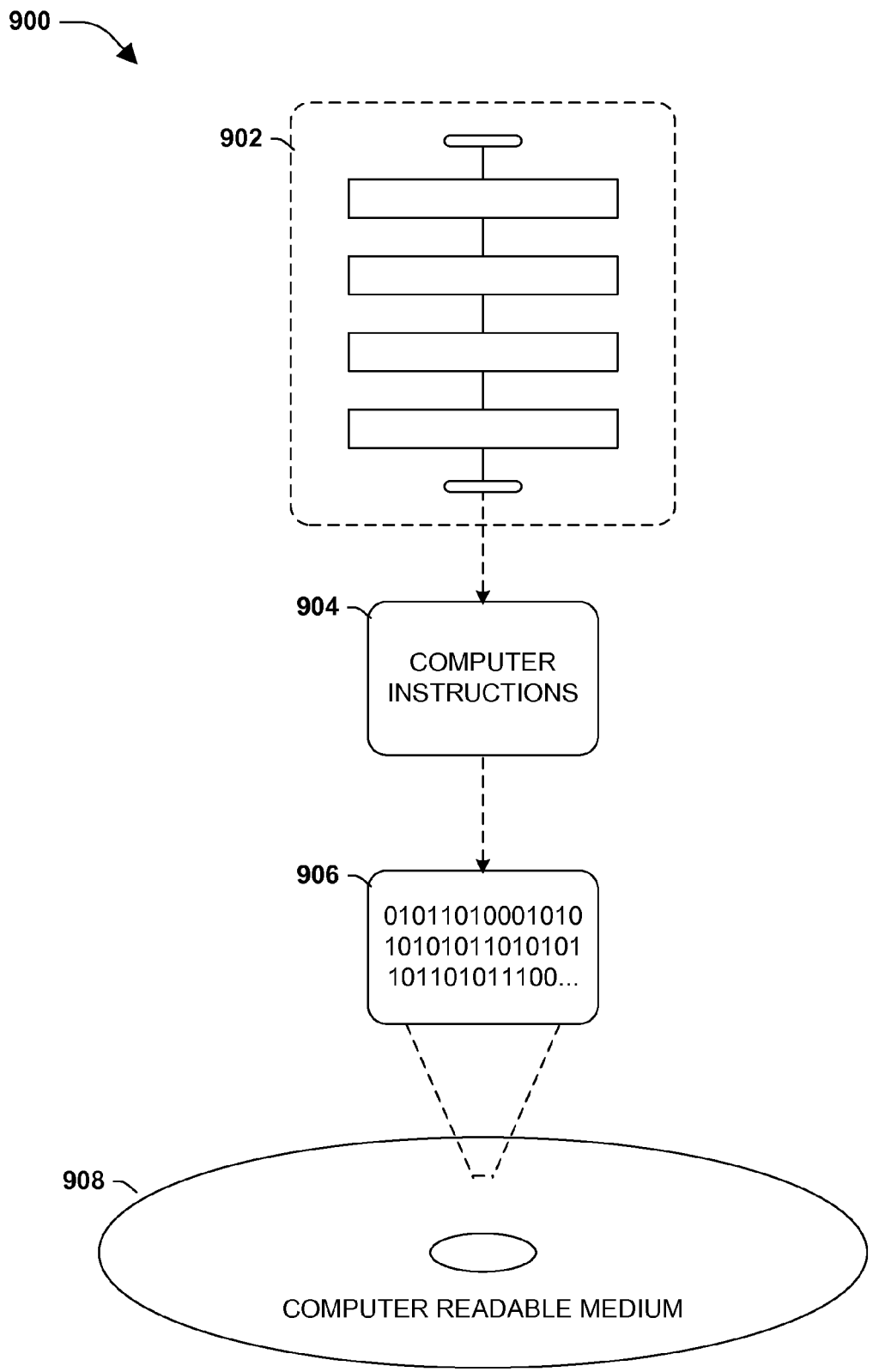
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1, for example. In some embodiments, the processor-executable instructions 904 are configured to implement a system, such as at least some of the exemplary system 200 of FIG. 2, at least some of the exemplary system 300 of FIG. 3, at least some of the exemplary system 400 of FIG. 4, at least some of the system 500 of FIG. 5, and/or at least some of the exemplary system 600 of FIG. 6A, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
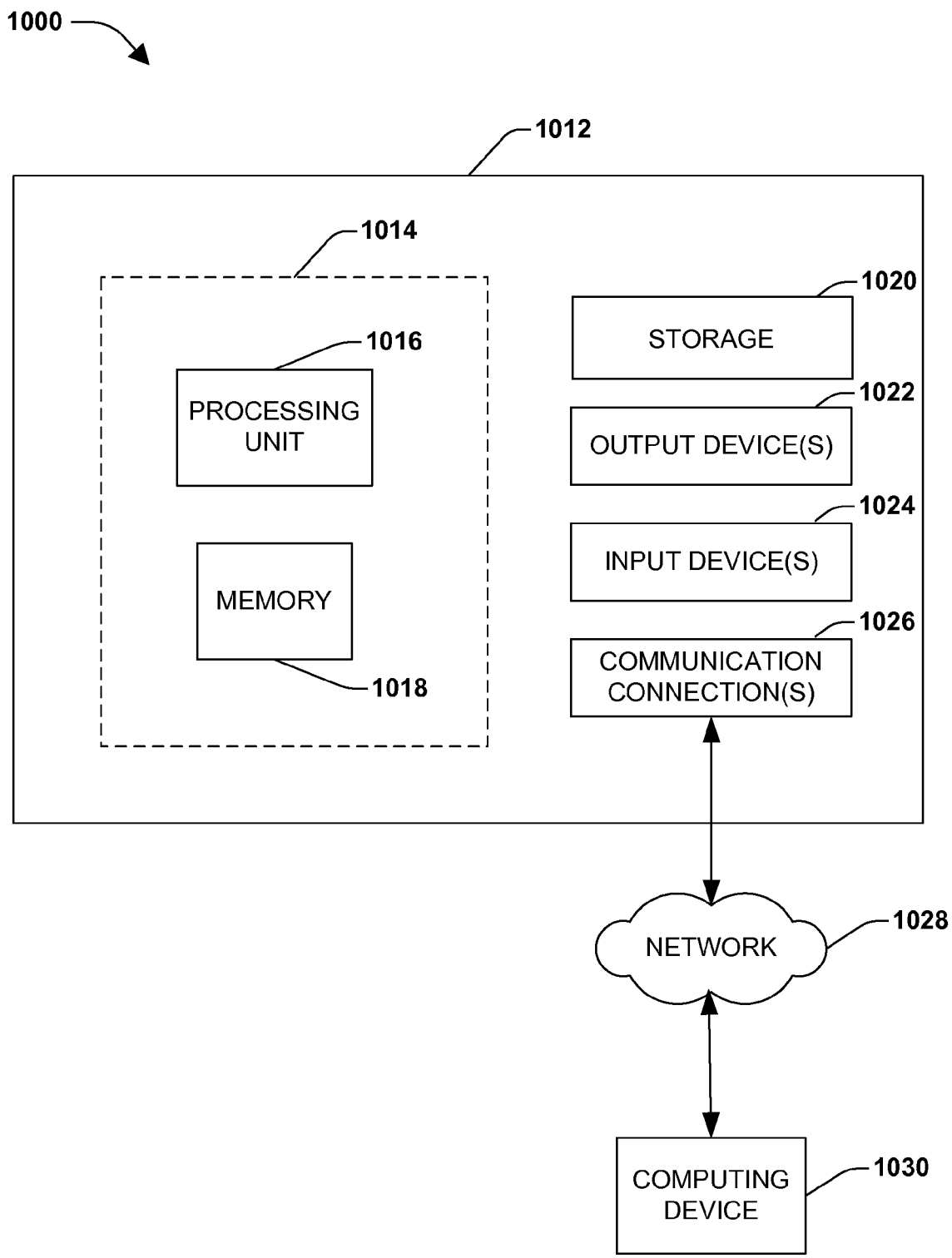
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1017. Depending on the exact configuration and type of computing device, memory 1017 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1017 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1017 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1017 may be comprised of multiple physical memory units located in different physical locations interconnected by a network.

Those skilled in the art will realize that storage devices utilized to store computer readable instructions may be distributed across a network. For example, a computing device 1030 accessible via a network 1027 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of improving provision of social media data via a graphical user interface that is physically generated on a hardware display device by a computing device, the method comprising:

obtaining, by the computing device, the social media data from multiple disparate social media sources;

identifying, on the computing device, a first set of social media data from the social media data, the first set of social media data corresponding to a first time range;

identifying, on the computing device, a first topic cluster from the first set of social media data, the first topic cluster comprising a first social media entry having a first topic similarity above a first topic clustering threshold;

generating, on the computing device, a first event summary for the first time range based upon the first topic cluster;

physically generating, on the hardware display device, as part of the graphical user interface, an information interface comprising annotated timeslots; and visually populating, on the hardware display device, a first timeslot, associated with the first time range, of the information interface with the first event summary to create a first annotated timeslot;

wherein the information interface is a year-in-review interface, comprising annotated timeslots each having a duration of a day, a week or a month, presented in a calendar format.

2. The method of claim 1, comprising:

identifying, on the computing device, a second topic cluster from the first set of social media data, the second topic cluster comprising a second social media entry having a second topic similarity above a second topic clustering threshold;

generating, on the computing device, a second event summary for the first time range based upon the second topic cluster; and visually populating, on the hardware display device, the first annotated timeslot with the second event summary.

3. The method of claim 1, comprising:

identifying, on the computing device, a second set of social media data from the social media data, the second set of social media data corresponding to a second time range;

identifying, on the computing device, a second topic cluster from the second set of social media data, the second topic cluster comprising a second social media entry having a second topic similarity above a second topic clustering threshold;

generating, on the computing device, a second event summary for the second time range based upon the second topic cluster; and visually populating, on the hardware display device, a second timeslot, associated with the second time range, of the information interface with the second event summary to create a second annotated timeslot.

4. The method of claim 1, comprising:

visually populating, on the hardware display device, a plurality of timeslots of the information interface with event summaries to create a plurality of annotated timeslots.

5. The method of claim 4, wherein the information interface is an interactive interface, the method further comprising:

physically generating, on the hardware display device, a first set of annotated timeslots based upon a first view granularity of the interactive interface, the first set of annotated timeslots corresponding to a first event summary granularity; and responsive to zoom input associated with the interactive interface, transitioning from displaying, on the hardware display device, the first set of annotated timeslots to a second set of annotated timeslots based upon a second view granularity specified by the zoom input, the second set of annotated timeslots corresponding to a second event summary granularity different than the first event summary granularity.

6. The method of claim 1, comprising:

performing, by the computing device, deduplication on the obtained social media data.

7. The method of claim 1, the identifying a first topic cluster comprising:

identifying, on the computing device, a first entity associated with the first social media entry;

identifying, on the computing device, a second entity associated with a second social media entry;

determining, on the computing device, that a relationship exists between the first entity and the second entity; and including, on the computing device, the second social media entry in the first topic cluster.

8. The method of claim 7, the generating a first event summary comprising:

including, on the computing device, the first entity and the second entity within the first event summary based upon the relationship.

9. The method of claim 1, comprising:

responsive to determining that the first event summary corresponds to a recurring event, visually populating, on the hardware display device, a future timeslot of the information interface with a future occurrence of the recurring event.

10. The method of claim 1, comprising:

evaluating, on the computing device, a profile of a user to identify a first interest of the user; and selectively displaying one or more event summaries, on the hardware display device, through the information interface, based upon the one or more event summaries corresponding to the first interest.

11. The method of claim 1, the information interface populated with a plurality of event summaries, and the method comprising:

selectively displaying, on the hardware display device, a first set of event summaries but not a second set of event summaries based upon a filter criteria.

12. A computing device comprising:

one or more processing units;

a hardware display device having physically generated thereon a graphical user interface; and one or more computer-readable media comprising computer-executable instructions, which, when executed by the one or more processing units, cause the computing device to:

obtain social media data from multiple disparate one or more social media sources;

identify a first set of social media data from the social media data, the first set of social media data corresponding to a first time range;

identify a first topic cluster from the first set of social media data, the first topic cluster comprising a first social media entry having a first topic similarity above a first topic clustering threshold;

generate a first event summary for the first time range based upon the first topic cluster;

physically generate, on the hardware display device, as part of the graphical user interface, an information interface comprising annotated timeslots; and visually populate, on the hardware display device, a first timeslot, associated with the first time range, of the an information interface with the first event summary to create a first annotated timeslot;

wherein the information interface is a year-in-review interface, comprising annotated timeslots each having a duration of a day, a week or a month, presented in a calendar format.

13. The computing device of claim 12, wherein the one or more computer-readable media comprise further computer-executable instructions, which, when executed by the one or more processing units cause the computing device to:

identify a second topic cluster from the first set of social media data, the second topic cluster comprising a second social media entry having a second topic similarity above a second topic clustering threshold;

generate a second event summary for the first time range based upon the second topic cluster; and visually populate, on the hardware display device, the first annotated timeslot with the second event summary.

14. The computing device of claim 12, wherein the one or more computer-readable media comprise further computer-executable instructions, which, when executed by the one or more processing units cause the computing device to:

visually populating, on the hardware display device, a plurality of timeslots of the information interface with event summaries to create a plurality of annotated timeslots;

physically generating, on the hardware display device, a first set of annotated timeslots based upon a first view granularity of the interactive interface, the first set of annotated timeslots corresponding to a first event summary granularity; and responsive to zoom input associated with the interactive interface, transitioning from displaying, on the hardware display device, the first set of annotated timeslots to a second set of annotated timeslots based upon a second view granularity specified by the zoom input, the second set of annotated timeslots corresponding to a second event summary granularity different than the first event summary granularity.

15. The computing device of claim 12, wherein the one or more computer-readable media comprise further computer-executable instructions, which, when executed by the one or more processing units cause the computing device to:

perform deduplication on the obtained social media data.

16. The computing device of claim 12, wherein the one or more computer-readable media comprise further computer-executable instructions, which, when executed by the one or more processing units cause the computing device to:

responsive to determining that the first event summary corresponds to a recurring event, visually populate, on the hardware display device, a future timeslot of the information interface with a future occurrence of the recurring event.

17. One or more computer memory comprising computer-executable instructions, which, when executed by a computing device, cause the computing device to:

obtain social media data from multiple disparate one or more social media sources;

identify a first set of social media data from the social media data, the first set of social media data corresponding to a first time range;

identify a first topic cluster from the first set of social media data, the first topic cluster comprising a first social media entry having a first topic similarity above a first topic clustering threshold;

generate a first event summary for the first time range based upon the first topic cluster;

physically generate, on a hardware display device, as part of a graphical user interface, an information interface comprising annotated timeslots; and visually populate, on the hardware display device, a first timeslot, associated with the first time range, of the an information interface with the first event summary to create a first annotated timeslot;

wherein the information interface is a year-in-review interface, comprising annotated timeslots each having a duration of a day, a week or a month, presented in a calendar format.

18. The computer memory of claim 17, comprising further computer executable instructions, which, when executed by the computing device, cause the computing device to:

identify a second topic cluster from the first set of social media data, the second topic cluster comprising a second social media entry having a second topic similarity above a second topic clustering threshold;

generate a second event summary for the first time range based upon the second topic cluster; and visually populate, on the hardware display device, the first annotated timeslot with the second event summary.

19. The computer memory of claim 17, comprising further computer-executable instructions, which, when executed by the computing device, cause the computing device to:

visually populating, on the hardware display device, a plurality of timeslots of the information interface with event summaries to create a plurality of annotated timeslots;

physically generating, on the hardware display device, a first set of annotated timeslots based upon a first view granularity of the interactive interface, the first set of annotated timeslots corresponding to a first event summary granularity; and responsive to zoom input associated with the interactive interface, transitioning from displaying, on the hardware display device, the first set of annotated timeslots to a second set of annotated timeslots based upon a second view granularity specified by the zoom input, the second set of annotated timeslots corresponding to a second event summary granularity different than the first event summary granularity.

20. The computer memory of claim 17, comprising further computer-executable instructions, which, when executed by the computing device, cause the computing device to:

responsive to determining that the first event summary corresponds to a recurring event, visually populate, on the hardware display device, a future timeslot of the information interface with a future occurrence of the recurring event.

* * * * *